Jan. 16, 1940.                M. MORGAN                2,187,091
                          SHEARING MECHANISM
                        Filed Oct. 10, 1938          2 Sheets-Sheet 1
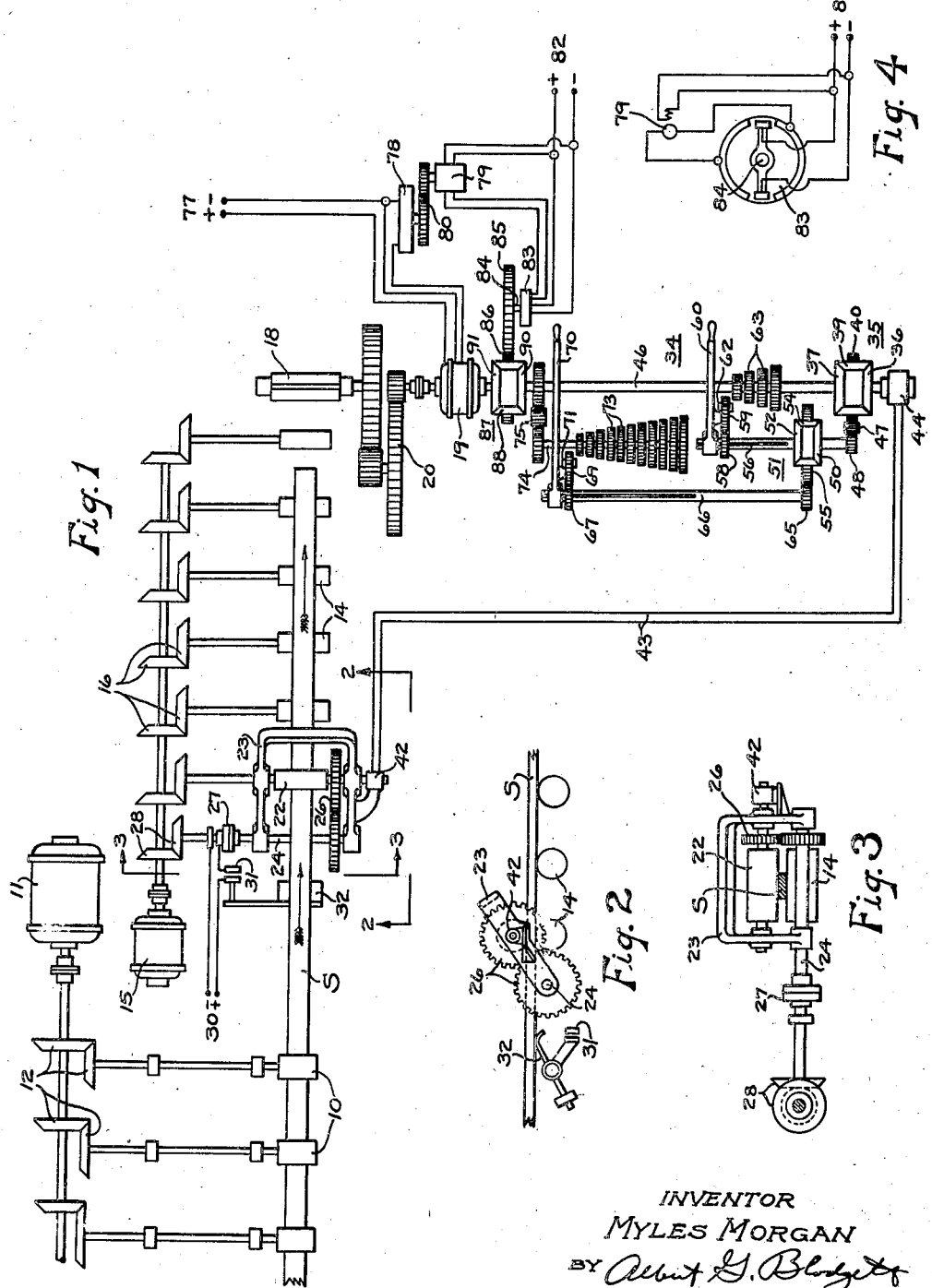
INVENTOR
MYLES MORGAN
BY Albert G. Blodgett
ATTORNEY Jan. 16, 1940.                M. MORGAN                2,187,091
                            SHEARING MECHANISM
                        Filed Oct. 10, 1938        2 Sheets-Sheet 2

INVENTOR
MYLES MORGAN
BY Albert G. Blodgett
ATTORNEY

Patented Jan. 16, 1940

2,187,091

UNITED STATES PATENT OFFICE 2,187,091

SHEARING MECHANISM

Myles Morgan, Worcester, Mass., assignor to Morgan Construction Company, Worcester, Mass., a corporation of Massachusetts Application October 10, 1938, Serial No. 234,227

11 Claims. (Cl. 164—68)

This invention relates to shearing mechanism, and more particularly to the construction and arrangement of mechanism for shearing predetermined lengths from longitudinally moving stock, such as the product of a metal rolling mill.

In the shearing of moving stock it is customary to utilize so-called flying shears, and such shears may be divided into two general classes. The first of these classes includes shears which may be described as of the "explosion" type, since they are usually stationary between cuts and are brought into action suddenly or "explosively" whenever a cut is to be made. One common form of explosion shear is the well-known steam actuated reciprocating flying shear. The control of the lengths of stock cut by an explosion type shear is a comparatively simple matter, since the stock itself can be used to trip a flag switch or similar device arranged to cause actuation of the shear, and the lengths can be varied merely by changing the position of the flag switch. The second of these classes includes shears which are commonly known as "rotary" shears, since in their simplest form they comprise a pair of rotating knives or blades between which the stock is passed. Cuts take place when the two knives meet in the course of their rotation. The term "rotary" is not limited to shears in which the knives travel in exact circular paths, since it is known practice to control the angular positions of the knives with respect to the stock in order to improve the cutting action. Furthermore, it is known practice to effect comparatively large changes in stock length by "gagging" the shear, a procedure which involves varying the path of travel of one knife periodically so that it will intersect the line of stock travel only after a predetermined number of revolutions. A very difficult problem is presented, however, in effecting small changes in stock lengths and in controlling these lengths with the accuracy required for many purposes. This problem involves the maintenance of an exact ratio between the linear speed of travel of the stock and the rate of rotation of the shear, together with provision for predetermining this ratio and making a series of small and predetermined changes therein. Because of the importance of this problem and the great difficulties which it presents, many different solutions have been proposed. Most of these solutions have proven unsatisfactory in that the cut lengths were inaccurate or could not be predetermined. Other solutions have been found impractical because of the great cost of construction, the comparatively large space required, etc.

It is accordingly one object of the invention to provide, in combination with a rotary flying shear, a comparatively simple and inexpensive mechanism whereby the lengths of stock cut by the shear can be predetermined and controlled with great accuracy.

It is a further object of the invention to provide an improved control mechanism for a rotary flying shear whereby accurate and predetermined lengths of stock can be cut, and particularly to provide a mechanism of this type which will require a comparatively small space and which will be thoroughly dependable in operation.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts:

Fig. 1 is a somewhat diagrammatic plan view of a shearing mechanism and associated parts;

Fig. 2 is a view taken on the line 2—2 of Fig. 1;

Fig. 3 is a section on the line 3—3 of Fig. 1;

Fig. 4 is a detail of a reversing switch and the associated electrical wiring.

Figure 5:
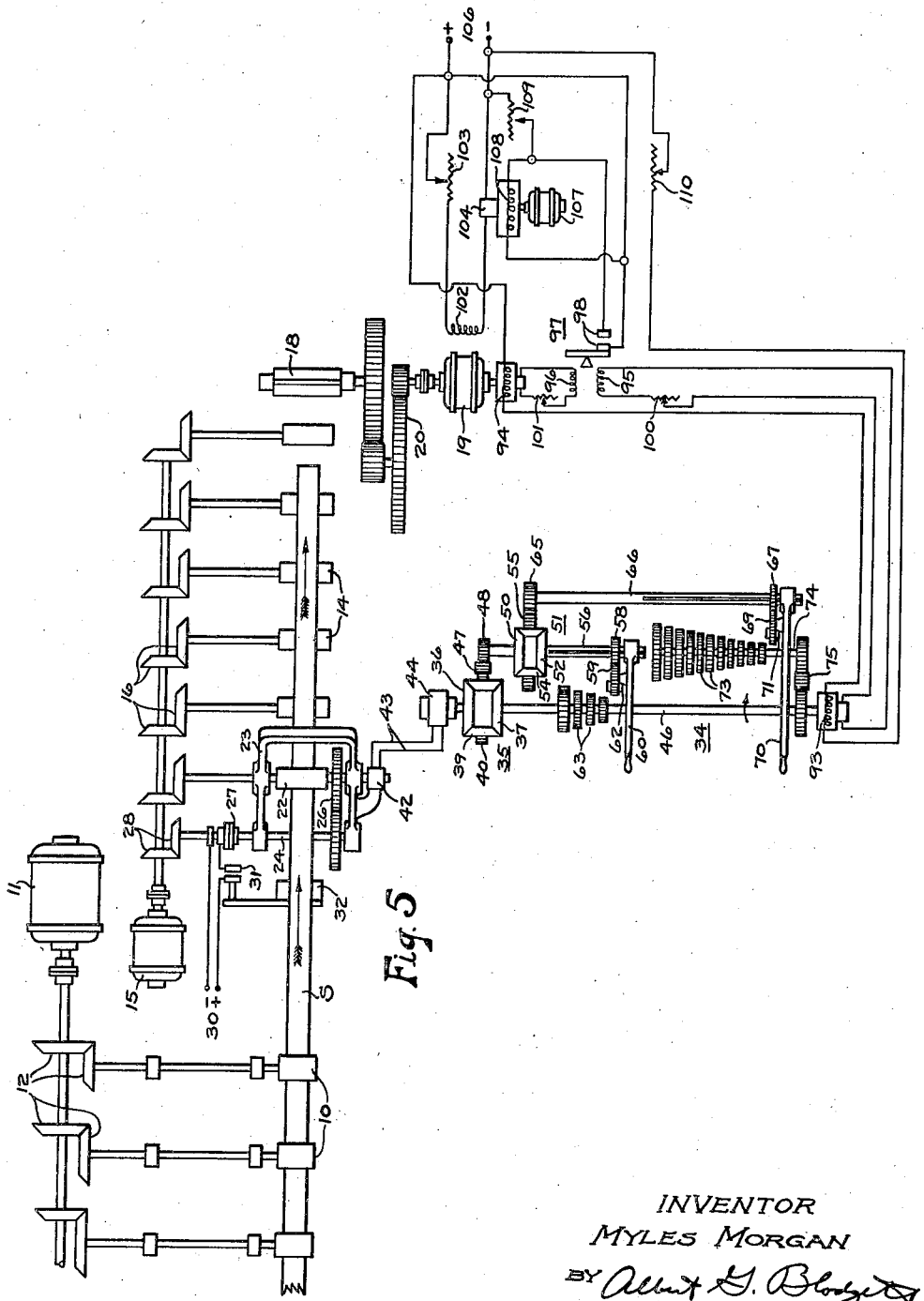
Fig. 5 is a view similar to Fig. 1, showing a modification.

The embodiment illustrated in Fig. 1 comprises a series of reducing rolls 10 forming a part of a metal rolling mill adapted to produce a rolled metal strip or bar S. These rolls 10 are driven in a well known manner by means of an electric motor 11 through the usual bevel gearing 12. The motor 11 may be of the variable speed type. After leaving the rolls 10 the stock S passes over a series of rollers 14 forming a roller table, these rollers being driven in a well known manner by means of an electric motor 15 through the usual bevel gearing 16. The motor 15 may likewise be of the variable speed type. Beyond the rollers 14 there is provided a rotary flying shear 18 of any suitable construction, which serves to cut the stock transversely into predetermined lengths. This shear is driven by a variable speed electric motor 19 through suitable gearing 20.

In order to control the lengths of the pieces cut by the shear 18, means is provided to maintain the speed of the shear motor 19 in a predetermined relationship to the speed of the stock S. For this purpose there is provided a horizontal roller 22 adapted to rest upon the upper surface of the stock and to be driven thereby. This roller is mounted in a yoke or frame 23 which is free to swing up or down about a horizontal shaft 24, so that various thicknesses of stock may be accommodated. The roller 22 is preferably located directly above one of the table rollers 14, to avoid any tendency to bend the stock. While it is intended that the roller 22 shall be driven by frictional engagement with the stock, it is desirable to provide auxiliary means whereby the roller may be driven at a peripheral speed approximately equal to the stock speed even when no stock is passing therebeneath, so that the stock will not be required to change the roller speed to any great extent. In the preferred construction illustrated this is accomplished by providing gears 26 which connect the roller 22 to the shaft 24, this shaft being connected to the motor 15 of the roller table 14 through a magnetic clutch 27 and bevel gearing 28. The clutch 27 is energized from a source 30 of electricity through a switch 31 controlled by a stock-actuated flag 32 located immediately in front of the roller 22. The motor 15 is regulated to maintain the peripheral speed of the rollers 14 and of the roller 22 approximately equal to the delivery speed of the last pair of reducing rolls 10. The various parts are so arranged that as the front end of the stock approaches the roller 22 the flag 32 will be depressed, opening the switch 31 and disengaging the clutch 27. The stock will thereupon contact with the roller 22 and drive the same at a speed varying directly with the speed of the stock.

The roller 22 is arranged to control the speed of the shear motor 19 through the medium of a variable-ratio geared transmission 34. This transmission comprises a primary differential 35 having two opposed sun gears 36 and 37 which are connected by planet gears 39 mounted within a ring gear 40. The sun gear 36 forms a power input element which is driven by the roller 22, and a suitable connection is provided for this purpose. It will ordinarily be advantageous to locate the transmission 34 at a point somewhat remote from the roller 22, and for this reason I prefer to utilize an electrical connection. In the embodiment illustrated there is provided a generator 42 which is mounted on the yoke 23 and directly connected to the roller 22. This generator 42 is connected by wires 43 to a synchronous motor 44 which serves to drive the sun gear 36. The sun gear 36 will therefore be rotated in exact synchronism with the roller 22. The sun gear 37 is connected to a shaft 46 forming a power output element, and it will be apparent that if the ring gear 40 is held stationary the shaft 46 will rotate at the same speed as the sun gear 36 but in the opposite direction. By rotating the ring gear 40 at different speeds, the speed of the shaft 46 may be varied as desired. For this purpose the ring gear 40 is connected through an indler gear 47 and a gear 48 to the sun gear 50 of a secondary differential 51 which is provided with a further sun gear 52. The sun gears 50 and 52 are connected by planet gears 54 mounted in a ring gear 55. The sun gear 52 is connected to a shaft 56 to which a gear 58 is slidably keyed. The gear 58 meshes with an idler gear 59 and both of these gears are mounted on a gear shift lever 60, these parts being so constructed and arranged that the idler gear 59 can be brought into mesh either with a stationary rack 62 or with a selected one of a cluster of gears 63 mounted on the shaft 46. The ring gear 55 meshes with a gear 65 connected to a shaft 66 to which a gear 67 is slidably keyed. The gear 67 meshes with an idler gear 69, and both of these gears are mounted on a gear shift lever 70, these parts being so constructed and arranged that the idler gear 69 can be brought into mesh either with a stationary rack 71 or with a selected one of a cluster of gears 73 mounted on a shaft 74. The shaft 74 is connected to the shaft 46 by suitable gearing 75.

It will be apparent that so long as the idler gears 59 and 69 are in mesh with their respective stationary racks 62 and 71, the ring gear 40 will be held fixed, and the speed of the shaft 46 will equal that of the motor 44. This condition preferably corresponds to a predetermined number of major units of stock length, say for example ten feet. By meshing the idler gear 59 with the smallest of the gears 63, the ring gear 40 will be rotated through the medium of the secondary differential 51 in a direction to decrease the speed of the shaft 46, and this may serve to increase the length of the cut pieces by one foot to say eleven feet. Similarly the successive gears 63 may each serve to add one foot to the length of the cut pieces, the largest gear corresponding to a length of fourteen feet. It will be understood however that no attempt has been made to show the gears in the correct proportions for any particular lengths of stock. The gears 73 are utilized when it is desired to cut lengths which are not exact multiples of the major unit. These gears may correspond to minor units of length, such as inches. Thus if lengths of eleven feet one inch are to be cut, the idler gear 59 will be placed in mesh with the smallest of the gears 63, and the idler gear 69 will be placed in mesh with the smallest of the gears 73. The ring gear 55 will then be rotated, and in conjunction with the rotation of the sun gear 52 this will impart just the right speed to the ring gear 40 to correspond to cut lengths of eleven feet one inch. By moving the idler gear 69 into mesh with successively larger gears 73, the lengths of the cut pieces may be increased one inch at a time, so that any desired lengths may be obtained within the limits of the apparatus.

In order to make these results possible I provide means to control the speed of the shear motor 19 and maintain its speed in a predetermined relationship to the speed of the shaft 46. Preferably these speeds are maintained equal. For this purpose the shear motor 19 is suitably connected to a power source 77 and to a field rheostat 78 whereby the motor speed can be controlled. This rheostat can be adjusted by means of a reversible electric pilot motor 79 which is connected to the rheostat by gearing 80. The pilot motor is suitably connected to a power source 82 and to a reversing switch 83 having a shaft 84 on which a gear 85 is mounted. This gear meshes with the ring gear 86 of a differential 87, this differential also comprising planet gears 88 mounted within the ring gear 86, a sun gear 90 driven by the shaft 46, and a sun gear 91 driven by the shear motor 19 in a direction opposite to that of the sun gear 90. These parts are so constructed and arranged that so long as the speed of the shear motor 19 is equal to that of the shaft 46, the ring gear 88 will remain stationary, and the switch 83 will remain in its neutral position as shown in Fig. 4, the pilot motor 79 being stationary. If however the slightest speed difference occurs between the sun gears 90 and 91, the ring gear 88 will turn, actuating the switch 83. This will start the pilot motor 79, and this motor will move the rheostat 78 in the proper direction to increase or decrease the speed of the shear motor 19, as may be required to return the sun gear 91 to its original phase relationship with respect to the sun gear 90, at the same time returning the switch 83 to neutral position.

It will be noted that the geared transmission 34 is required to transmit only sufficient power to actuate the reversing switch 83. Hence this transmission can be made very light and compact, and it can be easily installed in a small oil-tight housing if desired. In the drawings this mechanism has been greatly enlarged, as compared with the other parts of the apparatus, in order to make clear its construction and operation.

The operation of this embodiment will now be apparent from the above disclosure. The shift lever 60 is utilized to place the idler gear 59 in mesh with either the rack 62 or one of the gears 63, depending upon the number of whole feet in the lengths which are to be cut from the stock S. Similarly the shift lever 70 is utilized to place the idler gear 69 in mesh with either the rack 71 or one of the gears 73, depending upon the number of inches required in excess of a whole number of feet. The stock S is delivered by the mill rolls 10 at a speed controlled by the motor 11, and this speed may be varied to control loops or for any other purpose. The speed of the motor 15 is controlled by the operator to maintain the peripheral speed of the table rollers 14 and of the measuring roller 22 approximately equal to the delivery speed of the stock. As the front end of the stock engages the flag 32 it will open the switch 31 and disengage the clutch 27. Immediately thereafter the stock will pass beneath the roller 22 and drive this roller by frictional engagement therewith. Since the roller was already rotating at approximately the correct speed, substantially no shock or slipping will take place when the stock engages the same. The roller 22 drives the generator 42 which in turn drives the motor 44 in exact synchronism therewith. The motor 44 drives the sun gear 90 at a speed dependent upon the adjustment of the transmission 34, and the shear motor 19 drives the sun gear 91 at exactly the same speed as the sun gear 90. The slightest difference in the speed of these two sun gears will be corrected immediately by the action of the reversing switch 83, the pilot motor 79 and the rheostat 78. The shear motor 19 will thus drive the shear 18, through the gears 20, at a speed bearing a predetermined relationship to the delivery speed of the stock, and predetermined lengths of stock will be produced regardless of changes in the delivery speed. So long as the stock is engaged by the reducing rolls 10, these rolls will control its speed, but after it leaves the rolling mill the speed of the stock will be controlled by the roller table 14. However this will make no difference in the lengths cut, since the shear speed is controlled by the roller 22. It will also be apparent that changes in the diameters or grooving of the reducing rolls 10 will have no effect on the shearing mechanism. Furthermore, the roller 22 is long enough to allow the use of different passes in the rolling mill, for it is immaterial which part of the roller is engaged by the stock.

It is realized that no provision is shown in the embodiment illustrated for controlling the length of the front crop, or for matching the shear knife speed to that of the stock at the instant of cut. Apparatus for obtaining these results is disclosed in the patent to Edwards No. 1,599,880, granted September 14, 1926, and can be readily utilized in conjunction with the present invention if desired.

In Fig. 5 there is shown a modification of the invention which differs from the embodiment illustrated in Fig. 1 only in that a somewhat different means is provided to synchronize the speed of the shear motor 19 with the speed of the shaft 46 of the transmission 34. In Fig. 5 the shaft 46 drives a small pilot generator 93 (instead of the sun gear 90 of Fig. 1), and the shear motor 19 drives a small pilot generator 94 (instead of the sun gear 91 of Fig. 1). The armatures of the generators 93 and 94 are connected, respectively, in series with the coils 95 and 96 of a balanced coil relay 97 of known construction having vibratory contacts 98 and forming a control means for the shear motor 19. These armature circuits may be provided if desired with manually adjustable rheostats 100 and 101 respectively. The field 102 of the shear motor 19 is connected in series with a manually adjustable rheostat 103 and the armature of a counter E. M. F. generator 104, this circuit being energized from a source 106. The generator 104 is driven by a suitable constant speed motor 107. The field 108 of the generator 104 is connected in series with a manually adjustable rheostat 109, and this circuit is likewise energized from the source 106. The contacts 98 are connected in parallel with the field 108, so that they short-circuit this field when they are closed. The fields of the pilot generators 93 and 94 are connected in series and energized from the source 106, and if desired the field current can be controlled by a manually adjustable rheostat 110.

The operation of the apparatus shown in Fig. 5 will be exactly the same as that of the embodiment shown in Fig. 1, except for the means whereby the shear motor 19 is maintained in synchronism with the shaft 46. Hence I shall describe the operation of the synchronous tie only. The rheostats 100 and 101 are preferably so adjusted that equal voltages will be applied to the coils 95 and 96 when the shear motor 19 and the shaft 46 are rotating at the same speed. The counter E. M. F. generator 104 is driven at a constant speed and generates a voltage which opposes the excitation of the field 102 of the shear motor, producing a field strength such that the shear motor normally operates in exact synchronism with the shaft 46. If the speed of the stock S should decrease for any reason, the roller 22 will be rotated more slowly, and the speed of the shaft 46 will decrease in proportion. This will reduce the voltage applied to the coil 95, throwing the relay 97 out of balance and closing the contacts 98. This will short circuit the field 108 of the counter E. M. F. generator, reducing the voltage generated thereby and increasing the voltage across the field 102 of the shear motor. This will decrease the speed of the shear motor to correspond with the decrease in the speed of the shaft 46. Similarly, if the speed of the stock S increases, the speed of the shaft 46 will increase in proportion, the voltage applied to the coil 95 will increase, and the contacts 98 will open, the voltage produced by the counter E. M. F. generator 104 will increase, decreasing the voltage across the field 102 of the shear motor. This will increase the speed of the shear motor to correspond with the increased speed of the shaft 46. In actual operation the contacts 98 will flutter rapidly, so that the effective field strength of the shear motor will be an average value sufficient to maintain substantially exact synchronism between the speed of the motor and that of the shaft 46. The rheostat 103 will be used primarily to obtain an initial adjustment of the shear motor field circuit, to bring it within the range of operation of the automatic control, and once the correct setting has been obtained no further adjustments will ordinarily be required.

It will now be apparent that the invention provides a comparatively simple and inexpensive mechanism whereby the lengths of stock cut by a rotary flying shear may be controlled with great accuracy. By a simple adjustment of the geared transmission 34 it is possible to predetermine the exact lengths of the cut pieces, and no stock will be wasted in making experimental adjustments. Variations in the stock delivery speed or in the diameters of the reducing rolls 10 will not change the lengths in the slightest degree. By the action of the flag switch 31 and the magnetic clutch 27, substantially all shock and slipping will be avoided when the front end of the stock engages the roller 22, and this roller will immediately be rotated at exactly the speed of the stock. Since the transmission 34 is required to do no work except to actuate the reversing switch 83 in Fig. 1 or the small pilot generator 93 in Fig. 5, it can be made very light and compact, and the power which the roller 22 must supply is very small.

Having thus described my invention, what I claim as new and desire to secure by Letters Patent is:

1. Shearing mechanism comprising a rotary flying shear, means to deliver stock to the shear to be cut transversely into separate lengths, a roller arranged to be rotated by frictional engagement of the stock therewith, means to drive the shear at a speed varying in accordance with the speed of the roller, a clutch arranged to transmit power to the roller and drive the same when no stock is in contact therewith, and means to disengage the clutch when the front end of the stock approaches the roller.

2. Shearing mechanism comprising a rotary flying shear, means to deliver stock to the shear to be cut transversely into separate lengths, a roller located in advance of the shear and arranged to be rotated by frictional engagement of the stock therewith, means to drive the shear at a speed varying in accordance with the speed of the roller, a clutch arranged to transmit power to the roller and drive the same when no stock is in contact therewith, and a device located in advance of the roller and arranged to disengage the clutch when the front end of the stock approaches the roller.

3. Shearing mechanism comprising a rotary flying shear, a variable speed drive for the shear, a control means for the variable speed drive, means to deliver stock to the shear to be cut transversely into separate lengths, a variable-ratio transmission having a power input element and a power output element, means to drive the power input element at a speed varying directly with the delivery speed of the stock, and means to so adjust the control means in accordance with both the speed of the shear drive and the speed of the power output element as to maintain said speeds in a predetermined ratio.

4. Shearing mechanism comprising a rotary flying shear, a variable speed drive for the shear, a control means for the variable speed drive, means to deliver stock to the shear to be cut transversely into separate lengths, a variable-ratio transmission having a power input element and a power output element, a roller located in advance of the shear and arranged to be rotated by frictional engagement of the stock therewith, means connecting the roller with the power input element to drive the same, and means to so adjust the control means in accordance with both the speed of the shear drive and the speed of the power output element as to maintain said speeds in a predetermined ratio.

5. Shearing mechanism comprising a rotary flying shear, a variable speed motor connected to the shear to drive the same, a control means for the motor, means to deliver stock to the shear to be cut transversely into separate lengths, a variable-ratio transmission having a power input element and a power output element, means to drive the power input element at a speed varying directly with the delivery speed of the stock, and means to so adjust the control means in accordance with both the speed of the motor and the speed of the power output element as to maintain said speeds in a predetermined ratio.

6. Shearing mechanism comprising a rotary flying shear, a variable speed motor connected to the shear to drive the same, a control means for the motor, means to deliver stock to the shear to be cut transversely into separate lengths, a mechanically positive variable-ratio transmission having a power input element and a power output element, means to drive the power input element at a speed varying directly with the delivery speed of the stock, means to so adjust the control means in accordance with both the speed of the motor and the speed of the power output element as to maintain said speeds in a predetermined ratio, and means to adjust the ratio of the transmission in steps corresponding to units of length in the pieces cut from the stock.

7. Shearing mechanism comprising a rotary flying shear, a variable speed motor connected to the shear to drive the same, a control means for the motor, means to deliver stock to the shear to be cut transversely into separate lengths, two rotatable elements, means to rotate one of said elements at a speed varying directly with the delivery speed of the stock, means to so adjust the control means in accordance with both the speed of the motor and the speed of the other of said elements as to maintain said speeds in a predetermined ratio, and a variable-ratio transmission connecting said elements and having two adjusting devices one of which predetermines the number of major units of length in the pieces cut from the stock and the other of which predetermines the number of minor units of length in excess of a whole number of major units.

8. Shearing mechanism comprising a rotary flying shear, a variable speed motor connected to the shear to drive the same, a control means for the motor, means to deliver stock to the shear to be cut transversely into separate lengths, a differential having three rotatable elements, means to rotate one of said elements at a speed varying directly with the delivery speed of the stock, means to so adjust the control means in accordance with both the speed of the motor and the speed of another of said elements as to maintain said speeds in a predetermined ratio, and change-speed gearing connecting the third of said elements to one of the other two elements, whereby the lengths of the pieces cut from the stock can be predetermined.

9. Shearing mechanism comprising a rotary flying shear, a variable speed motor connected to the shear to drive the same, a control means for the motor, means to deliver stock to the shear to be cut transversely into separate lengths, a primary differential having three rotatable elements, means to rotate one of said elements at a speed varying directly with the delivery speed of the stock, means to so adjust the control means in accordance with both the speed of the motor and the speed of another of said elements as to maintain said speeds in a predetermined ratio, and change-speed gearing connecting the third of said elements to one of the other two elements to predetermine the number of major units of length in the pieces cut from the stock, the change-speed gearing including a secondary differential, and additional change-speed gearing connecting one element of the secondary differential to one element of the primary differential and arranged to predetermine the number of minor units of length in excess of a whole number of major units.

10. Shearing mechanism comprising a rotary flying shear, a variable speed driving means for the shear, a control means for the variable speed driving means, means to deliver stock to the shear to be cut transversely into separate lengths, a second driving means arranged to operate at a speed varying directly with the delivery speed of the stock, a variable-ratio transmission having a power input element and a power output element, means connecting one of said driving means to the power input element to drive the same, and means to so adjust the control means in accordance with both the speed of the other of said driving means and the speed of the power output element as to maintain said speeds in a predetermined ratio.

11. Shearing mechanism comprising a rotary flying shear, a variable speed motor connected to the shear to provide a driving means therefor, a control means for the motor, means to deliver stock to the shear to be cut transversely into separate lengths, a second driving means arranged to operate at a speed varying directly with the delivery speed of the stock, a mechanically positive variable-ratio transmission having a power input element and a power output element, means connecting one of said driving means to the power input element to drive the same, means to so adjust the control means in accordance with both the speed of the other of said driving means and the speed of the power output element as to maintain said speeds in a predetermined ratio, and means to adjust the ratio of the transmission in steps corresponding to units of length in the pieces cut from the stock.

MYLES MORGAN.